(12) United States Patent
Yamauchi et al.

(10) Patent No.: US 8,062,469 B2
(45) Date of Patent: Nov. 22, 2011

(54) ADHESIVE RESIN COMPOSITION AND BONDING METHOD

(75) Inventors: Satoshi Yamauchi, Fukushima-ken (JP);
Yoshiko Kaneko, Fukushima-ken (JP);
Katsufumi Kujira, Tokyo (JP); Shouji Sakamoto, Tokyo (JP)

(73) Assignee: Nippon Kasei Chemical Company Limited, Fukushima-ken (JP)

( * ) Notice: Subject to any disclaimer, the term of this patent is extended or adjusted under 35 U.S.C. 154(b) by 0 days.

(21) Appl. No.: 12/524,364

(22) PCT Filed: Feb. 5, 2008

(86) PCT No.: PCT/JP2008/000137
§ 371 (c)(1),
(2), (4) Date: Nov. 12, 2009

(87) PCT Pub. No.: WO2008/096530
PCT Pub. Date: Aug. 14, 2008

(65) Prior Publication Data
US 2010/0096082 A1  Apr. 22, 2010

(30) Foreign Application Priority Data
Feb. 6, 2007  (JP) ................. 2007-026613

(51) Int. Cl.
*B32B 7/12* (2006.01)
*C08F 8/14* (2006.01)
*C08G 65/32* (2006.01)
*C08L 77/06* (2006.01)
*C09J 163/00* (2006.01)

(52) U.S. Cl. ............. 156/330; 525/330.1; 525/403; 525/460; 525/436; 156/331.7; 156/327

(58) Field of Classification Search .......... 156/330, 156/331.7, 327; 525/330.1, 403, 460, 436
See application file for complete search history.

(56) References Cited

U.S. PATENT DOCUMENTS
6,121,378 A * 9/2000 Miyawaki et al. ........... 525/100
2004/0222408 A1 * 11/2004 Watanabe et al. ........... 252/500

FOREIGN PATENT DOCUMENTS
| JP | 11-284024   | 10/1999 |
| JP | 2005-206717 | 8/2005  |
| JP | 2006-342222 | 12/2006 |
| JP | 2007-258508 | 10/2007 |

OTHER PUBLICATIONS

International Search Report for PCT/JP2008/000137, mailed Mar. 25, 2008.

\* cited by examiner

*Primary Examiner* — Katarzyna Wyrozebski Lee
*Assistant Examiner* — Daniel Lee
(74) *Attorney, Agent, or Firm* — Nixon & Vanderhye P.C.

(57) ABSTRACT

The present invention relates to an inexpensive adhesive resin composition which is applicable even to a base material having a poor bonding property. The adhesive resin composition comprises (A) a polymer having no radical-polymerizable double bond and (B) a radical generating agent in which the radical generating agent (B) is present in an amount of 0.1 to 10 parts by weight on the basis of 100 parts by weight of the polymer (A). In the preferred embodiment of the present invention, the adhesive resin composition further comprises (C) a radical-polymerizable monomer wherein the monomer (C) is present in an amount of 0.1 to 10 parts by weight on the basis of 100 parts by weight of the polymer (A). The radical-polymerizable monomer (C) is a glycidyl group-containing monomer, and the glycidyl group-containing monomer is 4-hydroxybutyl acrylate glycidyl ether.

9 Claims, No Drawings

ADHESIVE RESIN COMPOSITION AND BONDING METHOD

This application is the U.S. national phase of International Application No. PCT/JP2008/000137 filed 5 Feb. 2008, which designated the U.S. and claims priority to JP Application No. 2007-026613 filed 6 Feb. 2007, the entire contents of each of which are hereby incorporated by reference.

TECHNICAL FIELD

The present invention relates to an adhesive resin composition and a bonding method.

BACKGROUND ART

Conventionally, various materials such as metals, glass, wood and plastics have been used as a base material in industrial applications, etc. Also, there have been provided various adhesives for bonding these base materials to other materials. In addition, in order to impart various properties such as a rust-proof property, an impact resistance, a water resistance and a weather resistance to these base materials, there have been provided various paints, resin films and coating agents, etc.

However, polyolefin-based plastic materials such as, for example, typically polypropylene, have such a problem that the materials tend to be deteriorated by themselves in bonding property and coatability owing to non-polarity and crystallizability thereof, although they are excellent in properties required as the base material. Therefore, these base materials are generally subjected to bonding and coating only after being previously subjected to surface treatments such as chemical treatment, corona discharge treatment and flame treatment. However, the effects of these surface treatments tend to be hardly stabilized owing to adverse influence by shapes of the base materials. In addition, the surface treatments tend to require use of special facilities, resulting in complicated process.

In addition to the above surface treatments, there is also known a method of directly modifying the base materials themselves to improve their bonding property and coatability by previously subjecting these materials to chlorination, grafting, etc. However, this method has such a drawback that it is not effective to improve a bonding property, a coatability, etc., of the existing base materials. In consequence, at present, any suitable method which is capable of effectively improving a bonding property or a coatability of the base materials without subjecting the materials to pretreatments, has not still been established.

On the other hand, as special adhesive materials, there have been proposed a resin composition comprising a specific polyolefin obtained by oxidative degradation (Patent Document 1) and a block copolymer obtained by bonding an isotactic polypropylene having a (mmmm) pentad content of 10 to 60% based on whole pentads therein to a polar group-containing polyolefin (Patent Document 2). However, these adhesive materials are very expensive.

Patent Document 1: Japanese Patent Application Laid-Open (KOKAI) No. 6-192617
Patent Document 2: Japanese Patent Application Laid-Open (KOKAI) No. 2005-48172

DISCLOSURE OF THE INVENTION

Problem to be Solved by the Invention

The present invention has been accomplished in view of the above conventional problems. An object of the present invention is to provide an inexpensive adhesive resin composition which is applicable even to base materials having a poor bonding property.

Means for Solving the Problem

As a result of the present inventors' earnest study, the following finding has been attained. That is, it has been unexpectedly found that when adding a radical generating agent to polymers obtained by polyaddition reaction such as, for example, urethane resins as general-purpose resins even though they have no radical-polymerizable bond, the resulting composition can exhibit an effective bonding property to the base materials.

The present invention has been attained on the basis of the above finding. In a first aspect of the present invention, there is provided an adhesive resin composition comprising (A) a polymer having no radical-polymerizable double bond and (B) a radical generating agent, the radical generating agent (B) being present in an amount of 0.1 to 10 parts by weight on the basis of 100 parts by weight of the polymer (A). In a second aspect of the present invention, there is provided a bonding method comprising the step of applying the above adhesive resin composition onto a base material to generate a radical derived from the radical generating agent (B). The adhesive resin composition according to the preferred embodiment of the present invention further comprises a small amount of (C) a radical-polymerizable monomer.

Effect of the Invention

According to the adhesive resin composition of the present invention, even when applying the composition to a base material having a low polarity and a poor bonding property such as, for example, polypropylene, it is possible to impart a good bonding property to its portion to be bonded without previously subjecting the base material to surface treatments such as corona discharge treatment or pretreatments for modifying properties of the base material itself such as chlorination and grafting. Therefore, the adhesive resin composition of the present invention can be used for bonding various kinds of base materials to each other, or upon painting or coating the base material.

PREFERRED EMBODIMENT FOR CARRYING OUT THE INVENTION

The present invention is described in detail below. However, the following description relates to typical embodiments of the present invention, and not intended to limit a scope of the present invention thereto.

The adhesive resin composition of the present invention comprises (A) a polymer having no radical-polymerizable double bond and (B) a radical generating agent. In the preferred embodiment of the present invention, the adhesive resin composition further comprises (C) a radical-polymerizable monomer. In addition, the adhesive resin composition of the present invention may also be diluted with water or a solvent according to applications and objects thereof.

Examples of the polymer (A) having no radical-polymerizable double bond include urethane resins, melamine resins, epoxy resins, polyester resins, polyamide resins, polycarbonate resins, high-density polyethylene and polypropylene. These polymers may be produced by polyaddition, addition condensation, polycondensation, ring-opening polymerization and ion polymerization (addition polymerization). Further, there may also be used acrylic resins such as acrylate resins obtained by radical polymerization as well as polyolefin resins such as low-density polyethylene. In the polymers obtained by radical polymerization, radical-polymerizable double bonds which have contributed to the chain reaction are dissipated by termination reaction and, therefore, do not remain therein. The molecular weight of the polymer (A) is not particularly limited, and the polymer (A) may be selected from those resins generally used with an optional molecular weight.

Examples of the radical generating agent (B) include thermal polymerization initiators, photopolymerization initiators and photosensitizers. These agents may be optionally selected according to kinds of energies applied.

Specific examples of the thermal polymerization initiators include azo-based initiators, ketone peroxide-based initiators, peroxyketal-based initiators, hydroxyperoxide-based initiators, dialkylperoxide-based initiators, diacylperoxide-based initiators, peroxyester-based initiators and peroxydicarbonate-based initiators. These thermal polymerization initiators may be optionally selected according to the base material used, a relationship between heat resistance, curing conditions, etc., of the polymer (A) and half-life period temperature of the thermal polymerization initiators, and capability of mixing with the polymer (A). The suitable heating temperature upon using these thermal polymerization initiators is usually 40 to 200° C.

Specific examples of the photopolymerization initiators and the photosensitizers include benzophenone-based initiators, diketone-based initiators, acetophenone-based initiators, benzoin-based initiators, thioxanthone-based initiators and quinone-based initiators. These photopolymerization initiators and the photosensitizers may be optionally selected according to wavelength of light irradiated and capability of mixing with the polymer (A). The suitable irradiation dose of ultraviolet light is generally 100 to 2000 $mJ/cm^2$ in terms of cumulative light amount when using a 80 W metal halide lamp.

The radical generating agent (B) is used in an amount of 0.1 to 10 parts by weight and preferably 0.2 to 3 parts by weight on the basis of 100 parts by weight of the polymer (A). When the amount of the radical generating agent (B) used is less than the above-specified range, generation of radicals tends to be insufficient, thereby failing to attain a desired bonding property. Even when the amount of the radical generating agent (B) used is more than the above-specified range, it may be difficult to attain a high bonding property corresponding to such a large amount used. Meanwhile, these radical generating agents (B) may be used in combination of any two or more thereof.

As the radical-polymerizable monomer (C), there are usually used those monomers having at least one carbon-to-carbon unsaturated bond having a radical polymerizability in a molecule thereof. The radical-polymerizable monomer (C) may be used for the purpose of enhancing the effects of the present invention. Examples of the carbon-to-carbon unsaturated bond having a radical polymerizability include a vinyl group, an aryl group and a (meth)acryloyl group. In the present invention, it is preferred that the monomer (C) further comprise one or more reactive substituent groups which are bonded to different positions from that of the carbon-to-carbon unsaturated bond having a radical polymerizability. Examples of the reactive substituent groups include an epoxy group, a carboxyl group, a hydroxyl group, an amino group, an amide group, a carbonyl group and a cyano group. Among these reactive substituent groups, a glycidyl group as one kind of epoxy group is preferred. The more preferred monomers (C) are those in which the distance between bonding positions of the reactive substituent groups in the same molecule is larger.

Specific examples of the radical-polymerizable monomer (C) include alkyl (meth)acrylates such as methyl acrylate, methyl methacrylate, ethyl acrylate, n-butyl acrylate, 2-ethylhexyl methacrylate and cyclohexyl methacrylate; hydroxyalkyl (meth)acrylates such as 2-hydroxybutyl acrylate, 4-hydroxybutyl acrylate, 1,4-cyclohexanedimethanol monoacrylate and 2-hydroxypropyl methacrylate; epoxyalkyl (meth)acrylates such as glycidyl methacrylate and 4-hydroxybutyl acrylate glycidyl ether (hereinafter referred to merely as "4HBAGE"); unsaturated carboxylic acids such as acrylic acid and methacrylic acid; (N-substituted) (meth) acrylamides such as acrylamide, diacetone acrylamide and N-methylol methacrylamide; and compounds having a plurality of radical-polymerizable carbon-to-carbon unsaturated bonds in the same molecule such as 1,6-hexanediol diacrylate, trimethyloipropane triacrylate and 1,3,5-triaryl isocyanates, as well as generally used monomers such as vinyl acetate, mesityl oxide, 4-hydroxybutyl vinyl ether and aryl glycidyl ethers. In the present invention, among these monomers, especially preferred is 4HBAGE.

The radical-polymerizable monomer, (C) is used in an amount of 0.1 to 10 parts by weight and preferably 0.5 to 5 parts by weight on the basis of 100 parts by weight of the polymer (A). Even when the amount of the radical-polymerizable monomer (C) used is more than the above-specified range, it may be difficult to attain a high bonding property corresponding to such a large amount used, and further there tends to occur problems such as malodor and stickiness of the resin owing to the radical-polymerizable monomer (C) partially remaining in an unreacted state in the resin. Meanwhile, these radical-polymerizable monomers (C) may be used in combination of any two or more thereof.

Examples of the base material to which the adhesive resin composition of the present invention is applied include polyethylene, polypropylene, polystyrene, polycarbonates, polyethylene terephthalate and polyamides. In addition, in the present invention, the surface treatments which are, in general, previously conducted for less adhesive base materials (such as, for example, corona discharge treatment) may be optional. However, by conducting these surface treatments, it is possible to attain a still higher effects of the present invention.

In the bonding method according to the present invention, the adhesive resin composition of the present invention is applied onto the base material to generate a radical derived from the radical generating agent. In general, the adhesive resin composition may be diluted with water or a solvent to adequately control a concentration of the composition upon use. In the present invention, before generating the radical, a coating film obtained by applying the composition onto the base material may be cured. That is, after uniformly coating the base material with a dilute solution of the adhesive resin composition of the present invention to form a coating film thereon, the coating film may be heated or dried to form a firm resin layer. The radical may be generated from the radical generating agent by applying energies such as heat and light (for example, ultraviolet light) thereof. The generation of the radical may be carried out at an optional time after forming the coating film by applying the adhesive resin composition of the present invention onto the base material. Usually, when curing the coating film by heating, the radical derived from the thermal polymerization initiator may be generated simultaneously with the heating.

The reason why the bonding property of the polymer (A) having no radical-polymerizable double bond to the base material is enhanced by action of the radical generating agent (B) is considered as follows, though it is not clearly determined. That is, it is suggested that the polymer (A) and/or the surface of the base material undergo certain chemical change by action of the radical generating agent (B).

EXAMPLES

The present invention is described in more detail below by the following examples. However, these examples are only illustrative and not intended to limit a scope of the present invention thereto.

<Production of Various Test Specimens>

In the following examples, etc., various test specimens were produced by the following procedure and subjected to peel test.

<Selection and Processing of Base Material>

The following kinds of test pieces (all having a thickness of 1 mm) produced by Nippon Test Panel Co., Ltd., were formed all into a strip shape having a longer side length of 70 mm and a shorter side length of 25 mm principally without being subjected to any surface treatments such as corona discharge treatment to thereby produce various test specimens. Meanwhile, any surface treatment, if otherwise conducted, was individually specified in the respective examples, etc. As the respective test pieces, there were used those formed from polycarbonates (hereinafter referred to merely as "PC"), polyethylene terephthalate (hereinafter referred to merely as "PET"), nylon 6 and polypropylene (hereinafter referred to merely as "PP").

<Selection and Processing of Nonwoven Fabric>

A nylon spun bonded fabric "WiWi" (tradename; product number: "R1005WTO") produced by Unitika Co., Ltd., was formed into a strip shape having a longer side length of 150 mm and a shorter side length of 25 mm to thereby produce various test specimens.

<Formulation of Adhesive Resin Composition>

Using various resins shown in the respective Examples, etc., the respective components were blended together at the following weight ratio to produce an adhesive resin composition. The solid content ratio between the resin, the radical-polymerizable monomer and the radical generating agent (resin/radical-polymerizable monomer/radical generating agent) in the blended mixture was adjusted to 100/3/1. Meanwhile, when using the radical-polymerizable monomer, at least one monomer selected from the group consisting of 4HBAGE, glycidyl methacrylate (hereinafter referred to merely as "GMA"), acrylic acid and methacrylic acid was blended in the composition, and the use of the monomer is specified in the respective Examples, etc. Also, when using the radical generating agent, "KAYAESTER 0-50" (tradename; chemical substance name: t-butylperoxy-2-ethyl hexanoate) produced by Kayaku-Akzo Co., Ltd., or "PERCUMYL H" (tradename; chemical substance name: cumene hydroperoxide) produced by Nippon Oils and Fats Co., Ltd., was blended in the composition, and the use of the radical generating agent is specified in the respective Examples, etc.

<Epoxy Resin>

As an epoxy resin, there was used a mixture obtained by blending "EPICOAT 828" (tradename; epoxy resin) and "EPICURE 3080" (tradename; curing agent) both produced by Japan Epoxy Resin Co., Ltd., with each other at a weight ratio of 10/3.

<Acrylic Resin>

As an acrylic resin, there was used a mixture obtained by blending "RIKABOND ES-620" (tradename; acrylic resin) and "RIKABOND ES-800" (tradename; acrylic resin) with each other at a weight ratio of 1/1.

<Urethane Resin>

As a urethane resin, there was used "U-COAT UWS-145" (tradename; polyester-based urethane resin) produced by Sanyo Kasei Co., Ltd., or "U-COAT UWS-2505" (tradename; polyether-based urethane resin) produced by Sanyo Kasei Co., Ltd. Further, there was used a polyurethane dispersion "PUD101" (product name developed by Nippon Kasei Co., Ltd.; polyether-based urethane resin) which was produced by the following method.

<Method for Production of PUD101>

A reactor was charged with 196.3 g of polytetramethylene ether glycol ("PTMG 1000" produced by Mitsubishi Chemical Corp.) having a molecular weight of 1,000, 129.1 g of isophorone diisocyanate and 17.2 g of dimethylolbutanoic acid, and the contents of the reactor were reacted with each other at 70° C. for 7 hr under a nitrogen flow, thereby obtaining a polyurethane resin. To the thus obtained polyurethane resin was added 11.7 g of triethylamine to neutralize the polyurethane resin. Successively, while stirring the resulting reaction mixture using a homomixer, 571.5 g of desalted water was added thereto. To the obtained polyurethane resin dispersion was added an aqueous solution prepared by mixing 14.5 g of a 80% aqueous solution of hydrazine hydrate in 59.7 g of water, while stirring using a homomixer, to conduct a chain extension reaction thereof, thereby finally obtaining the aqueous polyurethane resin dispersion "PUD101".

<Application of Adhesive Resin Composition onto Base Material>

Using a bar coater, the adhesive resin composition was uniformly applied onto the base material such that the resulting resin layer after drying had a thickness of 0.07 mm. Meanwhile, the adhesive resin composition was applied over a region of the base material extending from one of its shorter sides to the position spaced apart by 50 mm from the shorter side.

<Compression-bonding of Nonwoven Fabric to Base Material and Resin Layer>

The nonwoven fabric was superimposed on the resin layer formed on the base material such that the shorter side end of the base material on its side to which the adhesive resin composition has been applied was aligned with one of shorter sides of the nonwoven fabric, and further longer sides of the base material and the nonwoven fabric were aligned with each other. The resulting laminate was lightly compression-bonded to each other using a roll. Thereafter, the compression-bonded product was allowed to stand at room temperature for 30 min to subject it to preliminary drying.

<Curing of Resin Layer>

The respective pre-dried test specimens were placed in an oven preheated at 80° C. to cure the resin layer thereof at 80° C. for 5 hr under heating. Thereafter, the respective test specimens were taken out of the oven, cooled to room temperature, and then subjected to peel test.

<Method of Generating a Radical>

Simultaneously with heat-curing the resin layer, the radical generating agent was thermally decomposed by the heat to thereby generate a radical.

<Peel Test Method>

Using a constant rate extension type tensile tester "TENSILON RTM-500" manufactured by Orientec Co., Ltd., the respective test specimens were subjected to 90° peel strength test by drawing the base material and the nonwoven fabric thereof (at a pulling rate of 50 mm/min) to measure a strength of peeling between bonding surfaces of the base material and the resin layer. The thus measured peel strength of the respective test specimens was compared with that of a comparative test specimen (test specimen prepared by using an adhesive resin composition formed from the resin having no radical polymerizability solely) to examine the effect of improving a bonding property thereof. Meanwhile, the unit of the measured peel strength value is "kg/25 mm" because all of the test specimens used were commonly configured to have a bonding width of 25 mm.

Example 1 and Comparative Example 1

Epoxy Resin

An epoxy resin in the form of a mixture comprising "EPICOAT 828" and "EPICURE 3080" at a weight ratio 10/3 was used as a resin to evaluate a bonding property thereof to nylon 6. In addition, in the respective Examples, in order to generate a radical, "KAYAESTER O-50" as a radical generating agent was added to the epoxy resin. The results are shown in Table 1 below. Meanwhile, the respective radical-polymerizable monomers used are as described in the following parentheses: Comparative Example 1 (none); Example 1-1 (none); Example 1-2 (GMA); and Example 1-3 (4HBAGE).

TABLE 1

|  | Radical generating agent | Monomer | Peel strength (kg/25 mm) Nylon 6 |
|---|---|---|---|
| Comparative Example 1 | None | None | 0.34 |
| Example 1-1 | KAYAESTER O-50 | None | 0.52 |
| Example 1-2 | KAYAESTER O-50 | GMA | 1.24 |
| Example 1-3 | KAYAESTER O-50 | 4HBAGE | 1.92 |

Example 2 and Comparative Example 2

Acrylic Resin

An acrylic resin in the form of a mixture comprising "RIKABOND ES-620" and "RIKABOND ES-800" at a weight ratio 1/1 was used as a resin to evaluate a bonding property thereof to PC and nylon 6. In addition, in the respective Examples, in order to generate a radical, "PERCUMYL H" as a radical generating agent was added to the acrylic resin. The results are shown in Table 2 below. Meanwhile, the respective radical-polymerizable monomers used are as described in the following parentheses: Comparative Example 2 (none); Example 2-1 (none); Example 2-2 (GMA); and Example 2-3 (4HBAGE).

TABLE 2

|  | Radical generating agent | Monomer | Peel strength (kg/25 mm) | |
|---|---|---|---|---|
|  |  |  | PC | Nylon 6 |
| Comparative Example 2 | None | None | 1.00 | 1.09 |
| Example 2-1 | PERCUMYL H | None | 1.06 | 1.58 |
| Example 2-2 | PERCUMYL H | GMA | 1.30 | 2.11 |
| Example 2-3 | PERCUMYL H | 4HBAGE | 2.37 | 2.16 |

Example 3 and Comparative Example 3

Polyether-Based Urethane Resin

A polyether-based urethane resin "PUD101" was used as a resin to evaluate a bonding property thereof to PET, nylon 6, PP and corona discharge-treated PP. In addition, in the respective Examples, in order to generate a radical, "PERCUMYL H" as a radical generating agent was added to the polyether-based urethane resin. The results are shown in Table 3 below. Meanwhile, the respective radical-polymerizable monomers used are as described in the following parentheses: Comparative Example 3 (none); Example 3-1 (none); Example 3-2 (GMA); and Example 3-3 (4HBAGE). The "corona discharge-treated PP" means such a material obtained by previously subjecting a surface of PP as a base material to corona discharge treatment under a voltage of 15,000 V 20 times using an apparatus "PS-1" manufactured by Shin-Koh Denki Kelso Co., Ltd.

TABLE 3

|  | Radical generating agent | Monomer | Peel strength (kg/25 mm) | | | |
|---|---|---|---|---|---|---|
|  |  |  | PET | Nylon 6 | PP | Corona discharge-treated PP |
| Comparative Example 3 | None | None | 0.67 | 0.15 | 0.47 | 2.20 |
| Example 3-1 | PERCUMYL H | None | 1.41 | 1.34 | 0.63 | 2.94 |
| Example 3-2 | PERCUMYL H | GMA | 1.39 | 1.37 | 0.85 | 3.50 or more* |
| Example 3-3 | PERCUMYL H | 4HBAGE | 1.39 | 1.59 | 1.43 | 3.50 or more* |

Note
*As to the peel strength relative to the corona discharge-treated PP in Examples 3-2 and 3-3, since the nonwoven fabric was broken and ruptured earlier than occurrence of peeling between the bonding surfaces owing to enhanced bonding property, the peel strength is expressed by a strength at break.

Example 4 and Comparative Example 4

Polyester-Based Urethane Resin

A polyester-based urethane resin "U-COAT UWS-145" was used as a resin to evaluate a bonding property thereof to nylon 6, and PET. In addition, in the respective Examples, in order to generate a radical, "PERCUMYL H" as a radical generating agent was added to the polyester-based urethane resin. The results are shown in Table 4 below. Meanwhile, the respective radical-polymerizable monomers used are as described in the following parentheses: Comparative Example 4 (none); Example 4-1 (none); Example 4-2 (GMA); and Example 4-3 (4HBAGE).

TABLE 4

| | Radical generating agent | Monomer | Peel strength (kg/25 mm) PET | Nylon 6 |
|---|---|---|---|---|
| Comparative Example 4 | None | None | 1.20 | 1.69 |
| Example 4-1 | PERCUMYL H | None | 1.53 | 1.71 |
| Example 4-2 | PERCUMYL H | GMA | 3.50 or more* | 2.65 |
| Example 4-3 | PERCUMYL H | 4HBAGE | 3.50 or more* | 2.65 |

Note
*As to the peel strength relative to PET in Examples 4-2 and 4-3, since the nonwoven fabric was broken and ruptured earlier than occurrence of peeling between the bonding surfaces owing to enhanced bonding property, the peel strength is expressed by a strength at break.

Example 5 and Comparative Example 5

Polyether-Based Urethane Resin

A polyether-based urethane resin "U-COAT UWS-2505" was used as a resin to evaluate a bonding property thereof to PET. In addition, in the respective Examples, in order to generate a radical, "PERCUMYL H" as a radical generating agent was added to the polyether-based urethane resin. The results are shown in Table 5 below. Meanwhile, respective radical-polymerizable monomers used are as described in the following parentheses: Comparative Example 5 (none); Example 5-1 (none); Example 5-2 (acrylic acid); Example 5-3 (methacrylic acid); Example 5-4 (GMA); and Example 5-5 (4HBAGE).

TABLE 5

| | Radical generating agent | Monomer | Peel strength (kg/25 mm) PET |
|---|---|---|---|
| Comparative Example 5 | None | None | 0.62 |
| Example 5-1 | PERCUMYL H | None | 0.70 |
| Example 5-2 | PERCUMYL H | Acrylic acid | 1.00 |
| Example 5-3 | PERCUMYL H | Methacrylic acid | 1.17 |
| Example 5-4 | PERCUMYL H | GMA | 1.25 |
| Example 5-5 | PERCUMYL H | 4HBAGE | 3.50 |

The invention claimed is:

1. An adhesive resin composition consisting of (A) a polymer having no radical-polymerizable double bond and (B) a radical generating agent, the radical generating agent (B) being present in an amount of 0.1 to 10 parts by weight on the basis of 100 parts by weight of the polymer (A).

2. An adhesive resin composition according to claim 1, wherein the polymer (A) having no radical-polymerizable double bond is at least one resin selected from the group consisting of urethane resins, melamine resins, epoxy resins, acrylic resins, polyester resins, polyamide resins, polycarbonate resins and polyolefin resins.

3. A bonding method comprising the step of applying the adhesive resin composition as defined in claim 1 onto a base material and a step of generating a radical derived from the radical generating agent (B).

4. A bonding method according to claim 3, wherein polymer (A) having no radical-polymerizable double bond is at least one resin selected from the group consisting of urethane resins, melamine resins, epoxy resins, acrylic resins, polyester resins, polyamide resins, polycarbonate resins and polyolefin resins.

5. A bonding method according to claim 3, wherein the base material is at least one resin selected from the group consisting of polyethylene, polypropylene, polystyrene, polycarbonates, polyethylene terephthalate and polyamides.

6. A bonding method according to claim 3, wherein polymer (A) having no radical-polymerizable double bond is at least one resin selected from the group consisting of urethane resins, epoxy resins and acrylic resins, and the base material is at least one resin selected from the group consisting of polypropylene, polycarbonates, polyethylene terephthalate and polyamides.

7. A bonding method according to claim 6, wherein the urethane resin polymer (A) has at least one urethane resin selected from the group consisting of a polyester-based urethane resin and a polyether-based urethane resin.

8. A bonding method according to claim 6, wherein the polyamide as the base material is nylon 6.

9. A bonding method according to claim 3, further comprising a step of treating a surface of base material by corona discharge treatment before the step of applying the adhesive resin composition.

* * * * *